(12) United States Patent
Tsai et al.

(10) Patent No.: US 11,405,582 B2
(45) Date of Patent: Aug. 2, 2022

(54) PREPROCESSING OF HIGH-DYNAMIC-RANGE VIDEO USING A HYBRID LOOKUP TABLE SCHEME

(71) Applicant: Meta Platforms, Inc., Menlo Park, CA (US)

(72) Inventors: Chia-Yang Tsai, Bellevue, WA (US); Handong Li, Union City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 2 days.

(21) Appl. No.: 16/584,139

(22) Filed: Sep. 26, 2019

(65) Prior Publication Data

US 2020/0413004 A1    Dec. 31, 2020

Related U.S. Application Data

(60) Provisional application No. 62/868,549, filed on Jun. 28, 2019.

(51) Int. Cl.
*H04N 7/01*    (2006.01)
*H04N 11/24*    (2006.01)

(52) U.S. Cl.
CPC ........... *H04N 7/0125* (2013.01); *H04N 11/24* (2019.01)

(58) Field of Classification Search
None
See application file for complete search history.

(56) References Cited

U.S. PATENT DOCUMENTS 5,296,945 A    3/1994 Nishikawa et al.
5,524,024 A    6/1996 Lin
5,936,683 A    8/1999 Lin
6,259,439 B1    7/2001 Lippincott
7,818,158 B2    10/2010 McDonald et al.
9,246,731 B2    1/2016 Kim et al.
9,960,900 B2    5/2018 Azadet
2003/0007580 A1    1/2003 Nagata et al.

(Continued)

OTHER PUBLICATIONS

International Telecommunication Union, "Recommendation ITU-R BT.709-6—Parameter values for the HDTV standards for production and international programme exchange", Jun. 1, 2015, 19 pages.

(Continued)

*Primary Examiner* — Aaron M Richer
(74) *Attorney, Agent, or Firm* — FisherBroyles, LLP

(57) ABSTRACT

The disclosed method may include (1) receiving an input datum to be processed using a non-linear function to produce an output datum, (2) comparing the input datum to a plurality of indexes of a lookup table, where the indexes designate input endpoints of a plurality of piecewise-linear sections approximating the non-linear functions, and where the lookup table further includes, for each of the indexes (a) a slope of the piecewise-linear section corresponding to the index, and (b) an axis intercept of the piecewise-linear section corresponding to the index (2) selecting, based on comparing the input datum to the plurality of indexes, an index that designates the piecewise-linear section associated with the input datum, and (4) calculating, using the slope and the axis intercept corresponding to the selected index, the output data corresponding to the input datum. Video processing systems employing such a method are also disclosed.

20 Claims, 10 Drawing Sheets

(56) References Cited

U.S. PATENT DOCUMENTS

| | | | |
|---|---|---|---|
| 2010/0283874 A1* | 11/2010 | Kinrot | G06T 5/008 |
| | | | 348/242 |
| 2012/0170842 A1* | 7/2012 | Liu | G06T 5/007 |
| | | | 382/167 |
| 2015/0221280 A1* | 8/2015 | Van Der Vleuten | G06T 5/002 |
| | | | 382/167 |
| 2016/0205370 A1 | 7/2016 | Wallace | |
| 2016/0360212 A1* | 12/2016 | Dai | H04N 19/36 |
| 2017/0330529 A1* | 11/2017 | Van Mourik | G09G 3/2003 |
| 2018/0278967 A1* | 9/2018 | Kerofsky | H04N 19/186 |
| 2019/0014330 A1 | 1/2019 | Ramasubramonian et al. | |
| 2019/0052908 A1* | 2/2019 | Mertens | G09G 5/02 |
| 2019/0132617 A1* | 5/2019 | Liu | G06T 5/009 |

OTHER PUBLICATIONS

International Telecommunication Union, "Recommendation ITU-R BT.1886—Reference electro-optical transfer function for flat panel displays used in HDTV studio production", Mar. 1, 2011, 7 pages.

International Telecommunication Union, "Recommendation ITU-R BT.2020-2—Parameter values for ultra-high definition television systems for production and international programme exchange", Oct. 1, 2015, 8 pages.

International Telecommunication Union, "Recommendation ITU-R BT.2100-2—Image parameter values for high dynamic range television for use in production and international programme exchange", Jul. 1, 2018, 16 pages.

International Search Report and Written Opinion received for PCT Application Serial No. PCT/US2020/037243 dated Sep. 24, 2020, 12 pages.

Khan et al., "HDR image encoding using reconstruction functions based on piecewise linear approximations", Multimedia Systems, Springer, vol. 21, No. 6, Nov. 13, 2014, pp. 615-624.

* cited by examiner

PREPROCESSING OF HIGH-DYNAMIC-RANGE VIDEO USING A HYBRID LOOKUP TABLE SCHEME

CROSS REFERENCE TO RELATED APPLICATION

This application claims the benefit of U.S. Provisional Application No. 62/868,549, filed 28 Jun. 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
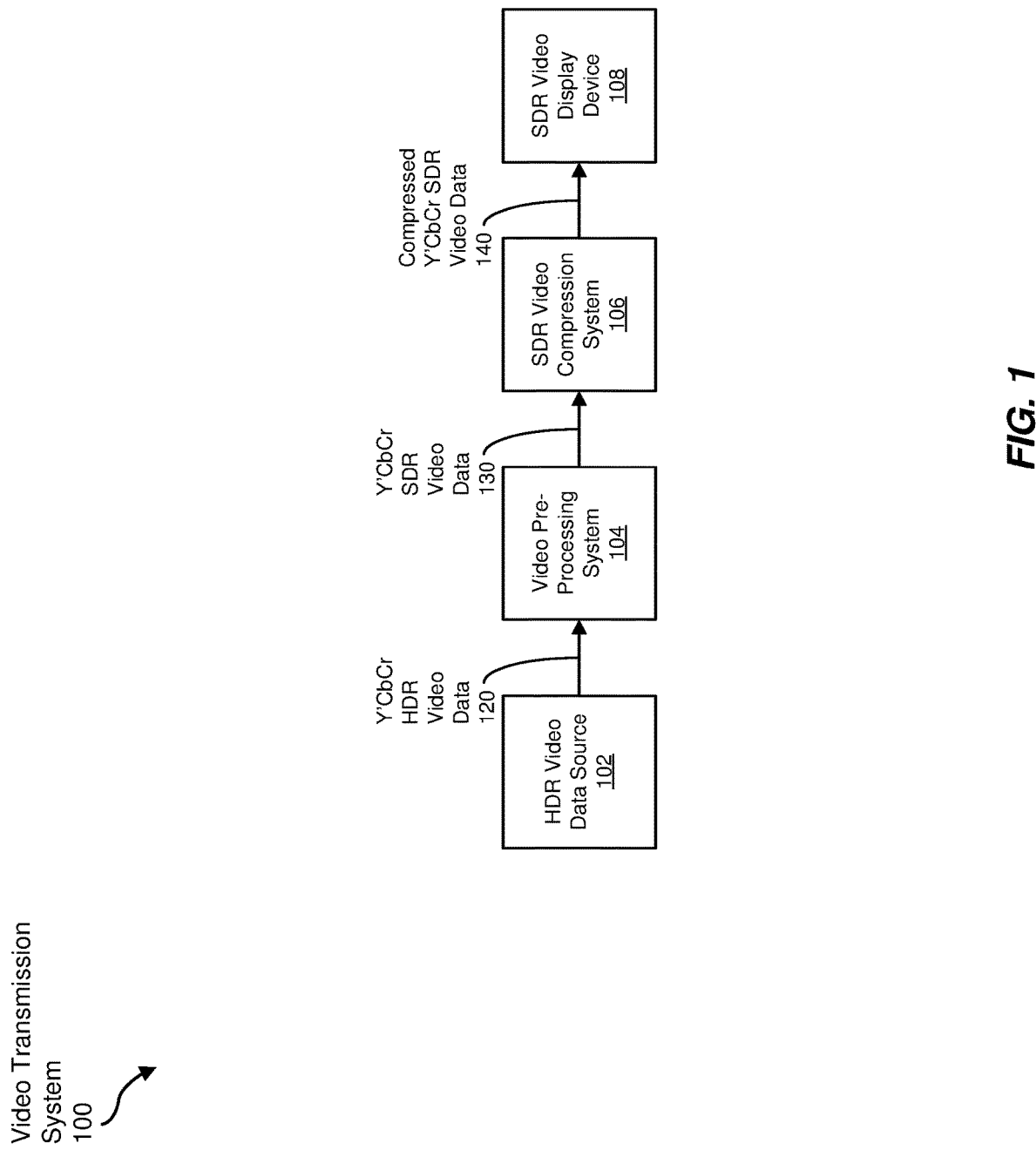
FIG. 1 is a block diagram of an exemplary video transmission system in which various embodiments of a video preprocessing system may be employed.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As high-dynamic-range (HDR) video (e.g., ultra-high-definition (UHD)) files and streams become more prevalent, the ability to view such video on a variety of devices (e.g., televisions, smart phones, tablets, and the like), including devices that are not capable of displaying HDR video, becomes more desirable. To accomplish this goal, conversion of HDR video to standard-dynamic-range (SDR) video (e.g., high-definition (HD) video) may be performed as a preprocessing stage prior to other processing of the video (e.g., compression of the resulting SDR video, transmission of the SDR video over a communication network or system, and so on). Generally, HDR video may be characterized as providing brighter white colors and deeper black colors than SDR video, as well as greater color depth (e.g., at least 10-bit color depth for HDR video versus 8-bit color depth for SDR video). Accordingly, in many examples, HDR video and SDR video may differ significantly in terms of dynamic range (e.g., the range of dark to light that may be displayed), color gamut (e.g., the range of different color representations possible), and electro-optical transfer function (EOTF) (e.g., the transfer function relating an electrical signal input to the resulting optical signal output). Consequently, the preprocessing of HDR video to generate SDR video may be computationally intensive. Particular examples of dynamic range and color gamut for HDR video are provided in Recommendation ITU-R (International Telecommunication Union—Radiocommunication Sector) BT.2020-2, while examples of dynamic range and color gamut for SDR video are presented in Recommendation ITU-R BT.709-6. Further, EOTFs for HDR video particularly described in Recommendation ITU-R BT.2020-2 are defined in Recommendation ITU-R BT.2100-2, while an EOTF for SDR video discussed in Recommendation ITU-R BT.709-6 is provided in Recommendation ITU-R BT.1886.

The present disclosure is generally directed to systems and methods of employing a non-linear function by way of piecewise-linear approximation using a hybrid lookup table (HLUT) function block. In some embodiments, such as those described herein, these systems and methods may be employed in the preprocessing of HDR video, such as to convert the HDR video to SDR video. As will be explained in greater detail below, in embodiments of the present disclosure, the preprocessing may include dynamic range mapping (e.g., tone mapping), color gamut conversion, EOTF calculations, inverse EOTF calculations, and/or color space conversions (e.g., between a luminance-chrominance (luma-chroma) color model (e.g., the luma/blue-difference chroma/red-difference chroma (Y'CbCr) model) and a primary color model (e.g., the red-green-blue (RGB) color model). While such calculations may involve a significant number of floating-point operations, such calculations may be replaced or approximated by fixed-point calculations in the preprocessing of HDR in some embodiments. In some examples, one or more lookup tables (LUTs) may be employed to perform the calculations quickly by way of piecewise-linear approximation. Moreover, in at least some embodiments discussed herein, use of one or more HLUT function blocks to perform piecewise-linear approximation may significantly reduce the size of the memory storing the LUTs, as well as possibly lower the number of data accesses and the overall power consumption of the preprocessing stage.

Figure 4:
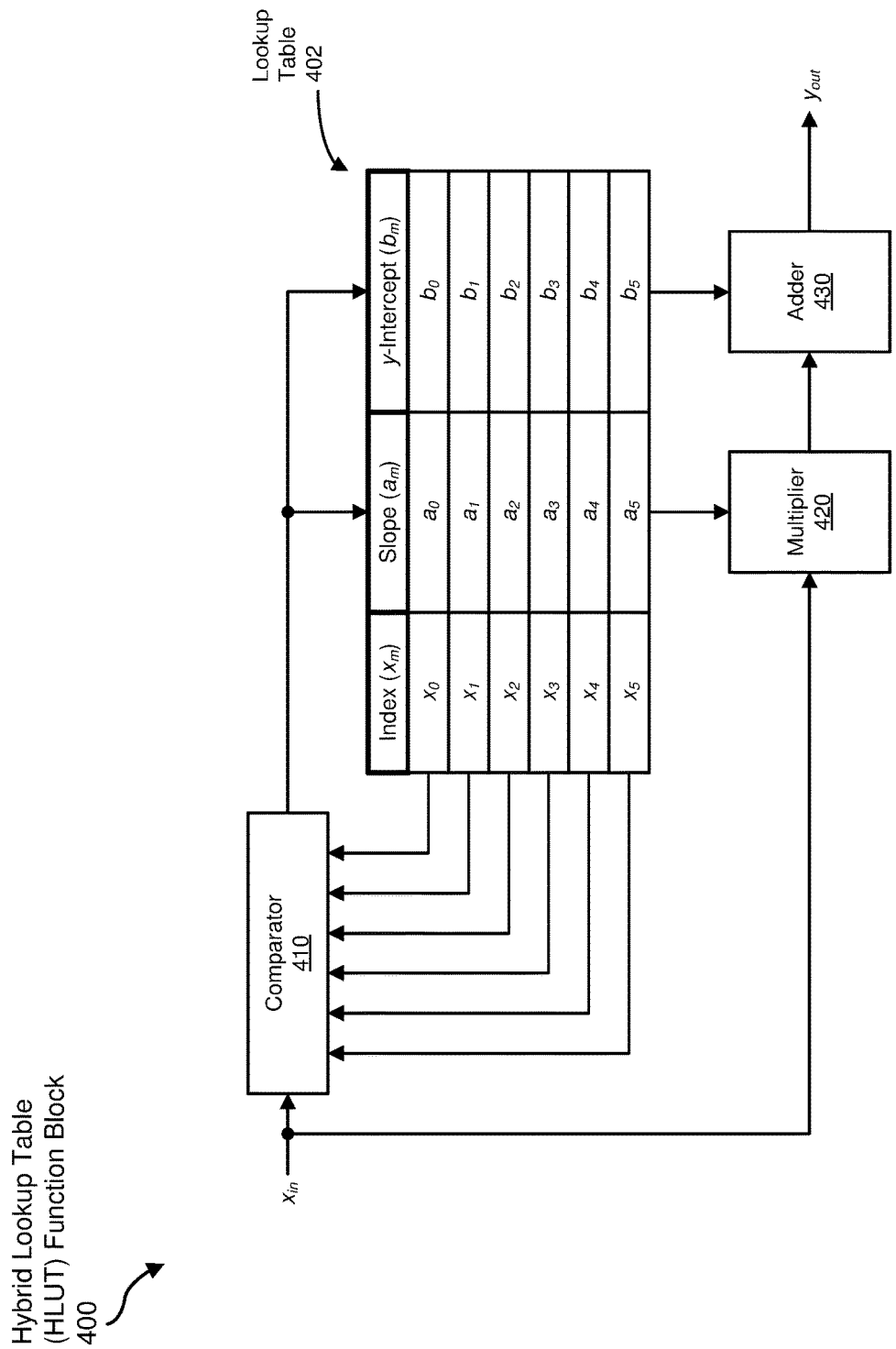
FIG. 4 is a block diagram of an exemplary hybrid lookup table (HLUT) function block employing piecewise-linear approximation that may be used in various operations of the video preprocessing system of FIG. 2.
Figure 5:
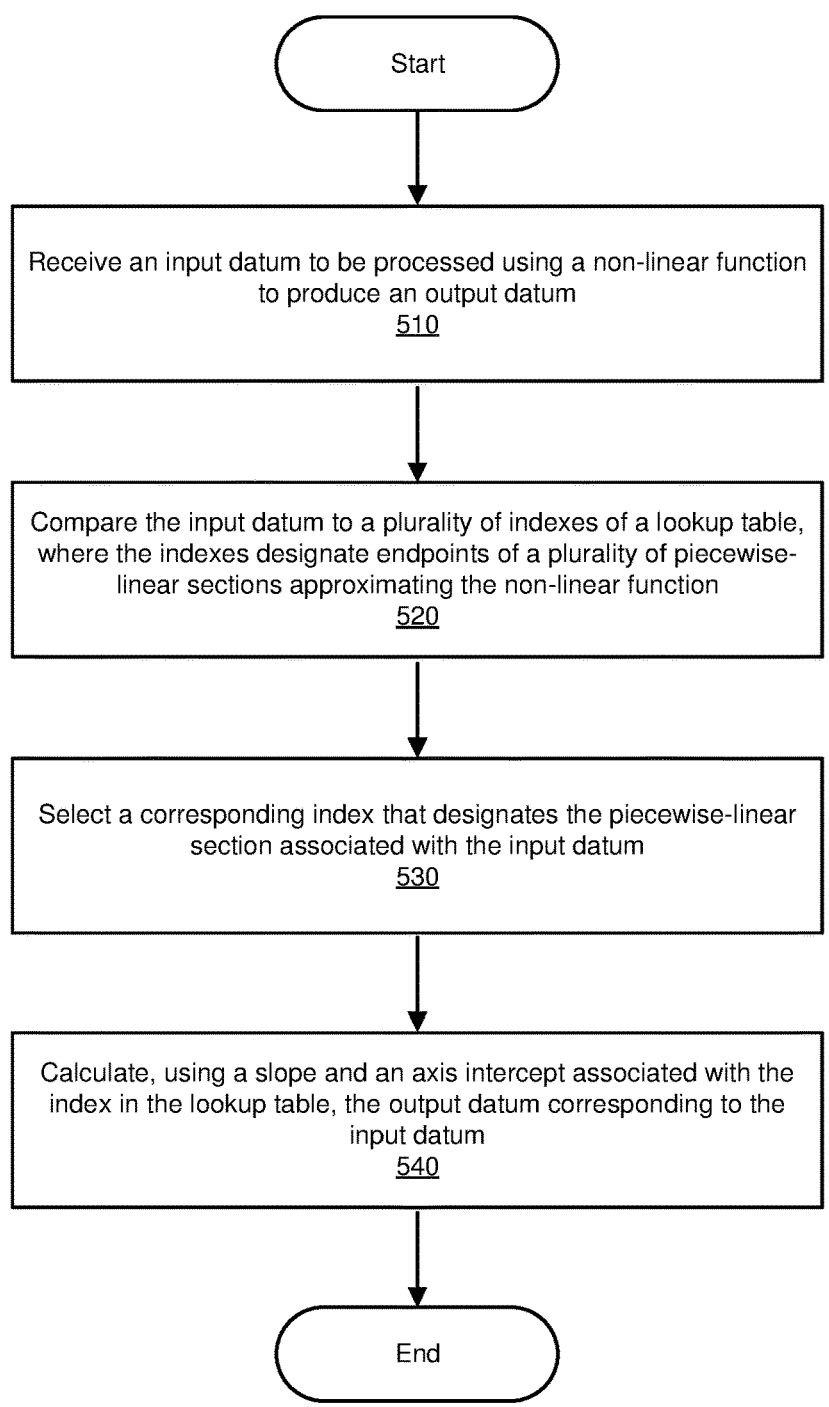
FIG. 5 is a flow diagram of an exemplary method of operating a hybrid lookup table function block, such as the hybrid lookup table function block of FIG. 4.
Figure 6:
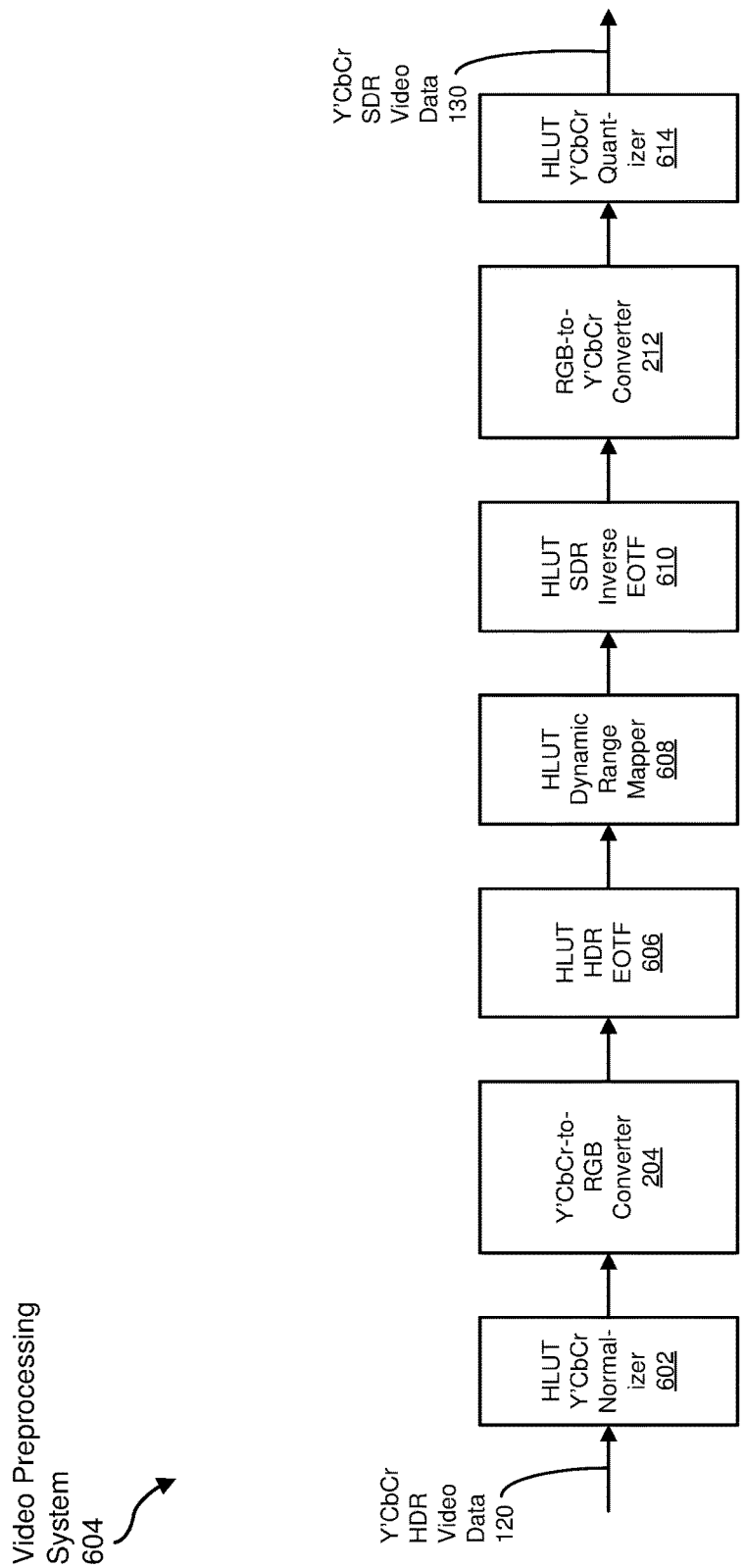
FIG. 6 is a block diagram of an exemplary video preprocessing system, in which one or more function blocks employ a hybrid lookup table function block.

The following will provide, with reference to FIGS. 1-10, detailed descriptions of systems and methods of video preprocessing of HDR video that include the use of operations based on a hybrid LUT (HLUT) scheme. A description of an exemplary video transmission system in which various embodiments of an exemplary video preprocessing system may be used is presented in connection with FIG. 1. An example of such a video preprocessing system is discussed in greater detail in conjunction with FIG. 2. In association with FIG. 3, the use of piecewise-linear approximation for non-linear functions is described. A description of an exemplary HLUT function block to employ piecewise-linear approximation is discussed in connection with FIG. 4, and a method of operating an exemplary HLUT function block is provided in conjunction with FIG. 5. Another exemplary video preprocessing system employing one or more HLUT function blocks is briefly discussed in connection with FIG. 6, and details of various embodiments employing one or more HLUT function blocks within the video preprocessing system of FIG. 6 are explained in conjunction with FIGS. 7-10.

In various embodiments discussed below, details regarding exemplary systems and methods of various preprocessing stage operations (e.g., Y'CbCr normalization, EOTF approximation, inverse EOTF approximation, Y'CbCr quantization, dynamic range mapping, and so on) are associated with converting HDR video (e.g., as defined by ITU-R (International Telecommunication Union—Radiocommunication Sector) Recommendation BT.2020-2, associated with ultra-high-definition television (UHDTV)) to SDR (e.g., as defined by ITU-R Recommendation BT.709-6, associated with high-definition television (HDTV)). However, various aspects described below may also be applied to other HDR and SDR formats not specifically discussed therein. Moreover, while the detailed HLUT function block embodiments described herein are employed specifically with respect to video preprocessing, many other types of operational environments not associated with video preprocessing may employ various embodiments of HLUT function blocks.

Additionally, while the various examples discussed hereinafter are described as being performed wholly or in part by hardware logic (e.g., in the form of hardware accelerators, such as for various non-linear fixed-point and/or floating-point operations), in other embodiments, the various methods and systems described below may be performed wholly or in part by a hardware processor executing software instructions that may be organized into one or more modules that are stored in one or more memory devices or on a computer-readable medium. Also, such operations may be performed within a server or other cloud-accessible device, a desktop or laptop computer, a tablet computer, a smartphone, an application-specific integrated circuit (ASIC), and so on.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 is a flow diagram of an exemplary video transmission system 100 for transmitting or otherwise delivering Y'CbCr HDR video data 120 as compressed Y'CbCr SDR video data 140 to an SDR video display device 108 (e.g., a smartphone, tablet computer, or other legacy device not capable of displaying Y'CbCr HDR video data 120, compressed or otherwise, correctly. As depicted in FIG. 1, video transmission system 100 may include an HDR video data source 102 (e.g., an HDR video server, an HDR video camera, or the like) that provides Y'CbCr HDR video data 120 to a video preprocessing system 104 that preprocesses or transforms Y'CbCr HDR video data 120 to Y'CbCr SDR video data 130. In some examples, an SDR video compression system 106 may compress incoming Y'CbCr SDR video data 130 to generated compressed Y'CbCr SDR video data 140. In some embodiments, compressed Y'CbCr SDR video data 140 may then be transmitted (e.g., via a wired and/or wireless communication network) to one or more SDR video display devices 108. In addition, in some examples, two or more of HDR video data source 102, video preprocessing system 104, or SDR video compression system 106 may be remotely located from each other, and thus may communicate by way of a communication network. Also, in some embodiments, while video data may be streamed from HDR video data source 102 to SDR video display device 108, the various components of video transmission system 100 may form a data pipeline such that different portions of a video may be processed by different components of video transmission system 100 simultaneously.

Figure 2:
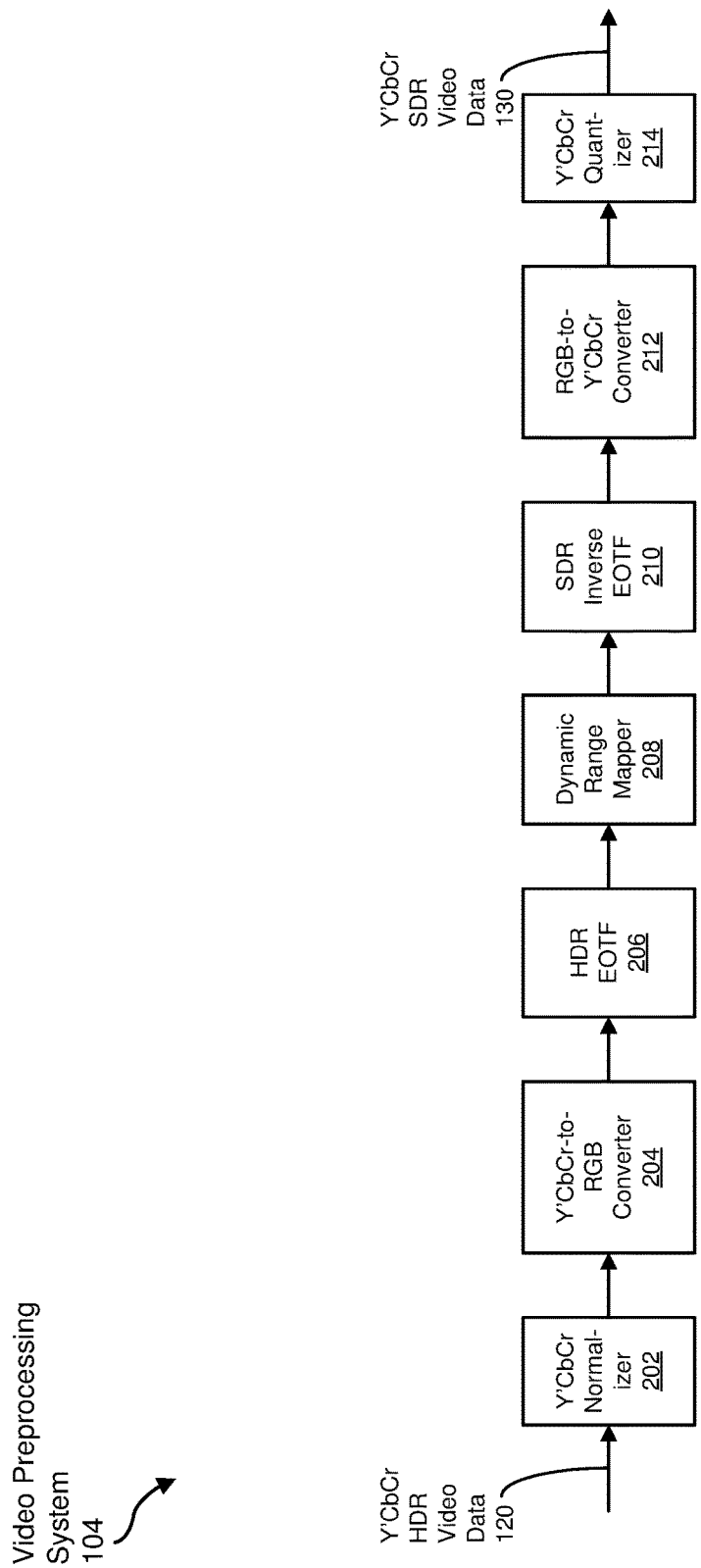
FIG. 2 is a block diagram of an exemplary video preprocessing system employable in the video transmission system of FIG. 1.

FIG. 2 is a block diagram of an exemplary video preprocessing system 104 employable in a video transmission system (e.g., video transmission system 100 of FIG. 1). As illustrated, video preprocessing system 104 may transform Y'CbCr HDR video data 120 to Y'CbCr SDR video data 130 to facilitate correct presentation of video data that is originally provided in an HDR format on a device that is capable of displaying only SDR video data. As illustrated in FIG. 2, video preprocessing system 104 may include, in order of execution (e.g., as a stage within a video data stream pipeline), a Y'CbCr normalizer 202, a Y'CbCr-to-RGB converter 204, an HDR EOTF 206, a dynamic range mapper 208 (e.g., for mapping from a high-dynamic-range format to a standard-dynamic-range format), an SDR inverse EOTF 210, an RGB-to-Y'CbCr converter 212, and a Y'CbCr quantizer 214. In some embodiments, each of components 202-214 of video preprocessing system 104 is embodied in logic hardware to facilitate enhanced processing speeds, although one or more of components 202-214 may be embodied as a plurality of software instructions executed by one or more hardware processors in some examples. The functionality of each of the components 202-214 is described below.

In some embodiments, video data is often provided in Y'CbCr format for compatibility with many video compression encoders. However, the conversion process from HDR video to SDR video typically occurs in the RGB format, as the difference in dynamic range between HDR and SDR video may also be accompanied by a difference in color gamut, as HDR video possesses a significantly greater range of colors that are optically presentable to the user than does SDR video. Moreover, the EOTF, and consequently the inverse EOTF, are also typically different between HDR video and SDR video. Accordingly, in at least some examples, the dynamic range conversion may be performed at the primary-color (e.g., RGB) format in the optical domain, which results in the series of function blocks or components 202-214 depicted in FIG. 2.

Y'CbCr normalizer 202, in some embodiments, may normalize incoming Y'CbCr HDR video data 120 to prepare Y'CbCr HDR video data 120 for conversion to the RGB format by Y'CbCr-to-RGB converter 204, which may expect the value of each Y' (luma) input datum to be within the range of zero to one, inclusive, and the value of each Cb and Cr (chroma) input datum to be within the range of −0.5 to 0.5, inclusive. More specifically, each Y'CbCr HDR video datum 120 may be a digital value of some predetermined number of bits (e.g., 8, 10, 12, 14, 16, and so on), while each corresponding output of normalized Y'CbCr HDR video data may be a floating-point number.

In some examples, Y'CbCr-to-RGB converter 204 may convert the normalized Y'CbCr HDR video data produced by Y'CbCr normalizer 202 to RGB HDR video data. More specifically, each color value (red, green, and blue) for each RGB HDR video datum may be a floating-point value in the range of zero to one, inclusive. Further, each color value for each RGB HDR video datum, in at least some embodiments, may be a linear combination of the Y', Cb, and Cr values of each corresponding normalized Y'CbCr HDR video datum.

The RGB HDR video data may then be received at HDR EOTF 206, which may convert the RGB HDR video data to RGB HDR digital data indicative of an optical representation, as presented to the user, of the RGB HDR video data. In some examples, the RGB HDR video data, as well as Y'CbCr HDR video data 120 and the normalized Y'CbCr HDR video data from which the RGB HDR video data is derived, may be non-linear in nature (e.g., due to gamma encoding to more efficiently represent light intensity levels), while the resulting RGB HDR digital data of the optical representation generated by HDR EOTF 206 may be linear (e.g., due to gamma decoding in HDR EOTF 206 to more accurately represent the light intensity of the video data to be presented to the user). Also, in at least some embodiments, the RGB HDR digital data generated by HDR EOTF 206 may be floating-point data (e.g., in the range of zero to one).

In some examples, dynamic range mapper 208 may then perform HDR-to-SDR format conversion to render the HDR video data compatible for non-HDR display devices. Moreover, in some embodiments, dynamic range mapper 208 may also perform color gamut conversion (e.g., when the color gamut of the HDR video format being used is wider than the color gamut of the SDR video format being employed). As with at least some of the preceding function blocks in FIG. 2, both the input HDR data and the output SDR data of dynamic range mapper 208 may be represented as floating-point values (e.g., in the range of zero to one). Also, dynamic range mapper 208 may generate SDR video data that is digital data of an optical representation of SDR video data that is ultimately to be provided to a display device.

After dynamic range mapper 208, the remaining stages of video preprocessing system 104 (e.g., SDR inverse EOTF 210, RGB-to-Y'CbCr converter 212, and Y'CbCr quantizer 214) substantially reverse the video data transformation in the SDR data format that was applied earlier in the HDR domain (e.g., by Y'CbCr normalizer 202, Y'CbCr-to-RGB converter 204, and HDR EOTF 206). For example, SDR inverse EOTF 210 receives the RGB SDR digital data light output from dynamic range mapper 208 and applies an SDR-specific reverse EOTF to produce electrical-domain RGB SDR video data output. In some embodiments, RGB reverse EOTF may also apply a non-linear gamma function to the input data to produce gamma-encoded RGB SDR video data.

Thereafter, in some embodiments, RGB-to-Y'CbCr converter 212 may convert the incoming RGB SDR video data to corresponding normalized Y'CbCr SDR video data (e.g., as floating-point values). This normalized SDR video data may then be forwarded to Y'CbCr quantizer 214 for quantizing (e.g., from floating-point values to fixed-point integer values). At this point, the resulting Y'CbCr SDR video data 130 may be in an appropriate form for data compression (e.g., in an MPEG-based format, such as by SDR video compression system 106 of FIG. 1) prior to transmission to an SDR video display device (e.g., SDR video display device 108 of FIG. 1).

Figure 3:
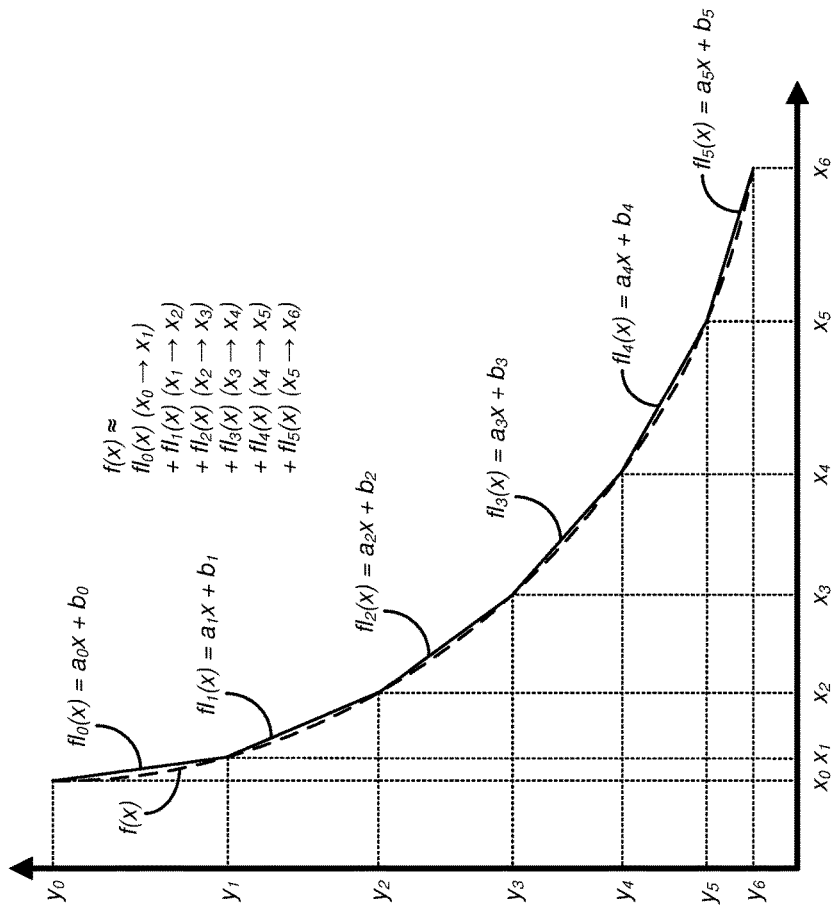
FIG. 3 is a graph of an exemplary piecewise-linear approximation of a non-linear function.

In some embodiments, one or more of stages or components 202-214 of video preprocessing system 104 may employ piecewise-linear approximation of one or more functions (e.g., non-linear functions) employed therein, as mentioned above, relating each input x to a corresponding output y. FIG. 3 is a graph of an exemplary piecewise-linear approximation 300 of a non-linear function $f(x)$ indicated by a dashed curve that relates each input x to a corresponding output y. In some embodiments, non-linear function $f(x)$ may be approximated by a series of piecewise-linear function sections. As depicted in FIG. 3, six piecewise-linear sections $fl_0(x)$, $fl_1(x)$, $fl_2(x)$, $fl_3(x)$, $fl_4(x)$, and $fl_5(x)$ (or, more generally, $fl_m(x)$), connected at their endpoints, form piecewise-linear approximation 300 of non-linear function $f(x)$. However, in other embodiments, greater or fewer piecewise-linear sections may be employed based on a level of accuracy desired for piecewise-linear approximation 300 relative to non-linear function $f(x)$. As illustrated in FIG. 3, each piecewise-linear section has a corresponding pair of endpoints (e.g., endpoints $(x_0, y_0)$ and $(x_1, y_1)$ for $fl_0(x)$, endpoints $(x_1, y_1)$ and $(x_2, y_2)$ for $fl_i(x)$, etc.). Also, as shown in FIG. 3, spacing between input x-values and/or output y-values of the endpoints may be varied from one piecewise-linear section $fl_m(x)$ to another due to one or more factors, such as to limit the amount of error in piecewise-linear approximation 300 relative to non-linear function $f(x)$, a shape of the curve described by non-linear function $f(x)$, and so on. However, in other examples, spacing between x-values or y-values of the endpoints of the piecewise-linear sections may be constant.

In some embodiments, each piecewise-linear section $fl_m(x)$ may be defined as a line of the form $fl_m(x)=a_m x+b_m$ for the input domain of $x_m$ to $x_{m+1}$ (e.g., $fl_0(x)=a_0 x+b_0$ for the input domain of $x_0$ to $x_1$, $fl_1(x)=a_1 x+b_1$ for the input domain of $x_1$ to $x_2$, and so on), where $a_m$ is the slope of $fl_m(X)$ and $b_m$ is the y-intercept of $fl_m(X)$. Consequently, piecewise-linear approximation 300 of non-linear function $f(x)$ may be the sum of piecewise-linear sections $fl_m(x)$.

FIG. 4 is a block diagram of an exemplary hybrid lookup table (HLUT) function block 400 employing piecewise-linear approximation (e.g., piecewise-linear approximation 300 of FIG. 3) that may be used in various operations of video preprocessing system 200 of FIG. 2. As shown in FIG. 4, HLUT function block 400 may include a lookup table 402, a comparator 410, a multiplier 420, and an adder 430. In some embodiments, each of lookup table 402, comparator 410, multiplier 420, and adder 430 may be implemented in logic hardware, such as within an application-specific integrated circuit (ASIC). However, software implementations of one or more of lookup table 402, comparator 410, multiplier 420, and adder 430 may also be employed in some examples.

Each entry m of lookup table 402, in some examples, may correspond with a particular piecewise-linear section $fl_m(x)$ and may include an index $x_m$, a corresponding slope $a_m$, and a y-intercept $b_m$. Accordingly, the number of entries of lookup table 402 may equal the number of piecewise-linear sections employed for non-linear function $f(x)$, which is six in the case of piecewise-linear approximation 300 of FIG. 3, but which could be any integer of two or more in other examples.

Given an input value $x_{in}$ for HLUT function block 400, comparator 410 may compare input value $x_{in}$ to one or more indexes $x_m$ to determine which slope $a_m$ and y-intercept $b_m$ to apply to input value $x_{in}$ to yield a corresponding output value $y_{out}$. For example, for input value $x_{in}$ from $x_0$ to $x_1$ inclusive, comparator 410 may employ slope $a_0$ and y-intercept $b_0$ associated with index $x_0$ to calculate output value $y_{out}$. For input value $x_{in}$ from $x_1$ to $x_2$ inclusive, comparator 410 instead may employ slope $a_1$ and y-intercept $b_1$ associated with index $x_1$ to calculate output value $y_{out}$. Comparator 410 may also employ indexes $x_2$ through $x_5$ in a similar manner so that slope $a_m$ and y-intercept $b_m$ of the appropriate piecewise-linear section $fl_m(X)$ is applied to each input value $x_{in}$ to yield an acceptable approximation for output value $y_{out}$. In some examples, comparator 410 may compare input value $x_{in}$ to each index $x_m$ in parallel to select the index $x_m$ corresponding therewith. In other embodiments, comparator 410 may perform a serial search of each index $x_m$, a binary search, or some other search algorithm.

Thereafter, multiplier 420 may multiply input value $x_{in}$ by slope $a_m$ associated with selected index $x_m$, and adder 430 may add the resulting product from multiplier 420 to y-intercept $b_m$ associated with selected index $x_m$. In some embodiments, the inputs of multiplier 420 (e.g., input value $x_{in}$ and slope $a_m$) and/or adder 430 (e.g., y-intercept $b_m$ and the product from multiplier 420) may be two fixed-point values, two floating-point values, or a fixed-point value and a floating-point value, and adder 430 may yield a fixed-point or floating-point result for output value $y_{out}$. Moreover, multiplier 420 and adder 430 may each provide a level of accuracy or precision (as reflected in the number of bits employed for performing the multiplication and addition operations within multiplier 420 and adder 430) deemed appropriate for HLUT function block 400. In some embodiments, the use of multiplier 420 and adder 430 in conjunction with lookup table 402 may be viewed as possibly requiring additional processing time beyond that of a strict lookup table arrangement that employs a significantly larger lookup table (as well as a more complicated and slower index comparator) with no associated multiplier or adder. However, the smaller footprint and power requirements that may be implicated by use of smaller lookup table 402, as used within HLUT function block 400, may represent an overall more desirable solution, especially within an implementation based completely on digital logic hardware, due to the smaller overall circuit footprint and power consumption that may result.

FIG. 5 is a flow diagram of an exemplary method 500 of operating a hybrid lookup table function block, such as HLUT function block 400 of FIG. 4. In one example, each of the steps of method 500 shown in FIG. 5 may represent an algorithm whose structure includes and/or is represented by multiple sub-steps. Moreover, while in at least some embodiments, method 500 may be performed entirely using digital logic hardware, software instructions executing on at least one hardware processor may perform one or more portions of one or more steps of method 500 in other examples.

At step 510, an input datum (e.g., input value $x_{in}$) to be processed using a non-linear function (e.g., non-linear function $f(x)$) to produce an output datum (e.g., output value $x_{out}$) may be received. At step 520, the input datum may be compared (e.g., using comparator 410) a plurality of indexes (e.g., indexes $x_m$) of a lookup table (e.g., lookup table 402), where the indexes designate endpoints of a plurality of piecewise-linear sections (e.g., piecewise-linear sections $fl_m$ (X)) approximating the non-linear function. At step 530, a corresponding index that designates the piecewise-linear section associated with the input datum may be selected (e.g., using comparator 410). At step 540, using a slope (e.g., slope $a_m$) and an axis intercept (e.g., y-intercept $b_m$) associated with the index in the lookup table, the output datum corresponding to the input datum may be calculated (e.g., by way of multiplier 420 and adder 430).

FIG. 6 is a block diagram of an exemplary video preprocessing system 600, in which one or more function blocks employ a hybrid lookup table function block (e.g., HLUT function block 400 of FIG. 4). As is the case with video preprocessing system 104 of FIG. 2, video preprocessing system 604 receives and processes Y'CbCr HDR video data 120 to generate Y'CbCr SDR video data 130. Further, in some embodiments, video preprocessing system 604 employs a number of components that provide the same or similar functionality to components 202-214 of video preprocessing system 104, as described above. More specifically, in some examples, one or more of several components of video preprocessing system 604 (e.g., an HLUT Y'CbCr normalizer 602, an HLUT HDR EOTF 606, an HLUT dynamic range mapper 608, an HLUT SDR inverse EOTF 610, and/or an HLUT Y'CbCr quantizer 614) may employ one or more HLUT function blocks 400 to perform their corresponding functions. In some embodiments described in greater detail below, Y'CbCr-to-RGB converter 204 and RGB-to-Y'CbCr converter 212 may not employ HLUT function block 400, as such conversions may employ strictly linear combinations of Y' (luma), Cb (blue-difference chroma), and Cr (red-difference chroma) input data to generate each of the associated R (red), G (green), and B (blue) output data or linear combinations of R, G, and B input data to create each of the corresponding Y', Cb, and Cr output data, especially since optimized hardware logic blocks for such functions may be available for implementation. However, in other examples, one or more HLUT function blocks may be employed in such conversions.

Figure 7:
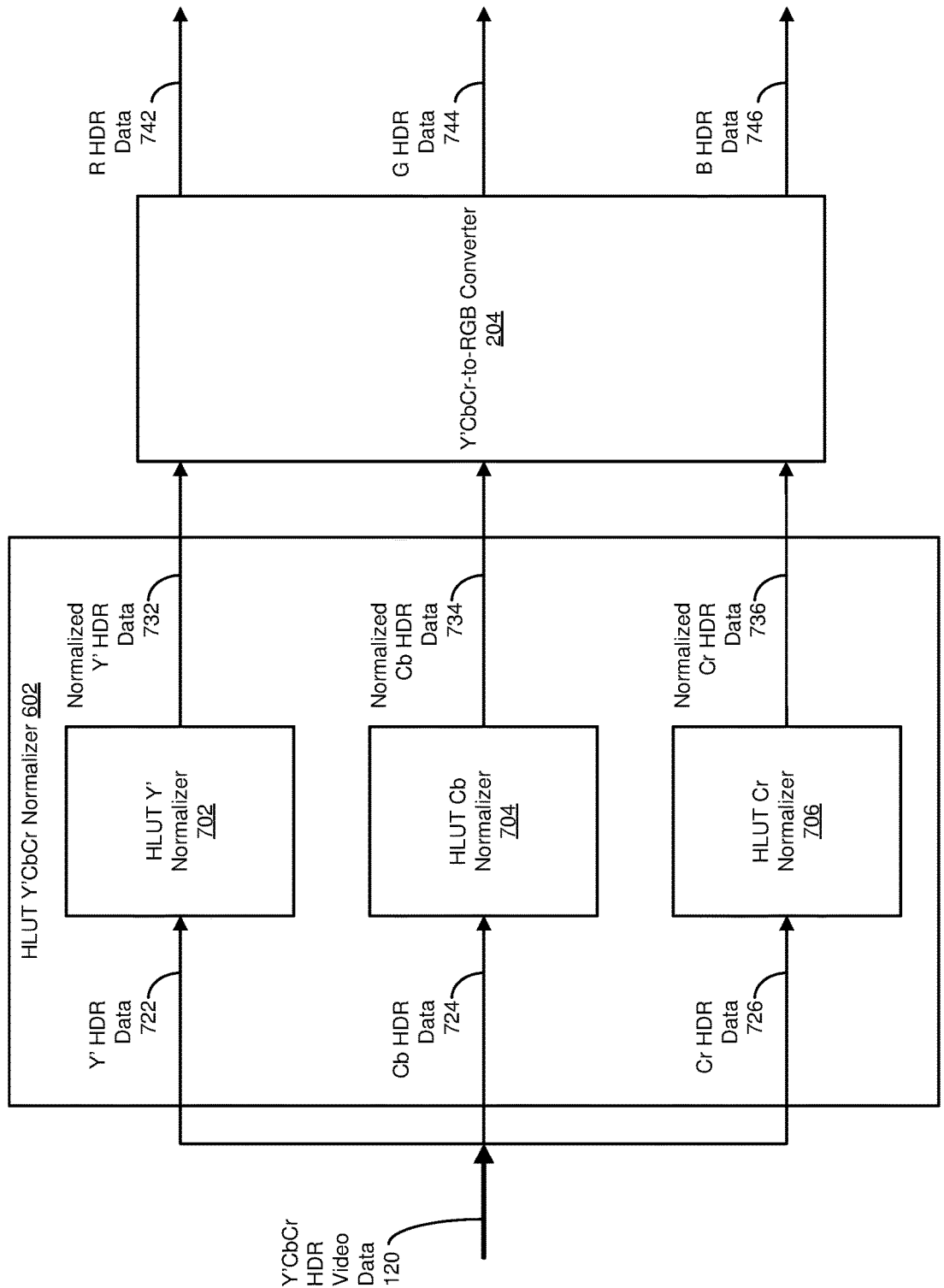
FIG. 7 is a block diagram of an exemplary video data normalizer employing multiple hybrid lookup table function blocks, along with a video format converter, that may be used in the video preprocessing system of FIG. 6.

FIG. 7 is a block diagram of an exemplary HLUT Y'CbCr normalizer 602 employing multiple HLUT function blocks, along with Y'CbCr-to-RGB converter 204, that may be used in video preprocessing system 604. In some embodiments, HLUT Y'CbCr normalizer 602 may include an HLUT function block 400 for each individual luma/chroma component of Y'CbCr HDR video data 120 (e.g., pixel-by-pixel of each frame of video data) to normalize that particular component from its original fixed-point positive-integer form. For example, HLUT Y'CbCr normalizer 602 may include an HLUT Y' normalizer 702 to normalize Y' HDR data 722 into normalized Y' HDR data 732 (e.g., a floating-point number in the range of zero to one), an HLUT Cb normalizer 704 to normalize Cb HDR data 724 into normalized Cb HDR data 734 (e.g., a floating-point number in the range of −0.5 to 0.5), and an HLUT Cr normalizer 706 to normalize Cr HDR data 726 into normalized Cr HDR data 736 (e.g., a floating-point number in the range of −0.5 to 0.5). In some embodiments, each of HLUT Y' normalizer 702, HLUT Cb normalizer 704, and HLUT Cr normalizer 706 may normalize incoming video data according to a piecewise-linear approximation of each of the following functions, where N is the number of bits of fixed-point Y' HDR data 722, Cb HDR data 724, and Cr HDR data 726, respectively (e.g., N=8, 10, 12, or the like), and "<<" is the bitwise logical left-shift operation:

$$Y'_{normalized} = \left(\frac{Y'}{1 \ll (N-8)} - 16\right) \bigg/ 219$$

$$Cb_{normalized} = \left(\frac{Cb}{1 \ll (N-8)} - 128\right) \bigg/ 224$$

$$Cr_{normalized} = \left(\frac{Cr}{1 \ll (N-8)} - 128\right) \bigg/ 224$$

In some examples, while the equations presented above for generating normalized Y' HDR data 732 ($Y'_{normalized}$), normalized Cb HDR data 734 ($Cb_{normalized}$), and normalized Cr HDR data 736 ($Cr_{normalized}$) may be substantially linear in nature, the normalization of a fixed-point integer to a floating-point fractional number may introduce a non-linear quality to the normalizing function. Also, in other examples, normalization of Y' HDR data 722, Cb HDR data 724, and Cr HDR data 726 may involve functions other than those shown above which are non-linear in nature.

Normalized Y' HDR data 732, normalized Cb HDR data 734, and normalized Cr HDR data 736, in some examples, may then be provided as input data (e.g., floating-point input) to Y'CbCr-to-RBG converter 204, which may employ that data as input to a set of linear combinations to generate each of R HDR data 742, G HDR data 744, and B HDR data 746, each of which may also be represented as a floating-point number. In some embodiments, R HDR data 742, G HDR data 744, and B HDR data 746 (designated as R, G, and B below) may each be generated according to the following linear functions in matrix form, although other functions are also possible:

$$\begin{bmatrix} R \\ G \\ B \end{bmatrix} = \begin{bmatrix} 1 & 0 & 1.47460 \\ 1 & -0.16455 & -0.57135 \\ 1 & 1.88140 & 0 \end{bmatrix} \begin{bmatrix} Y'_{normalized} \\ Cb_{normalized} \\ Cr_{normalized} \end{bmatrix}$$

Figure 8:
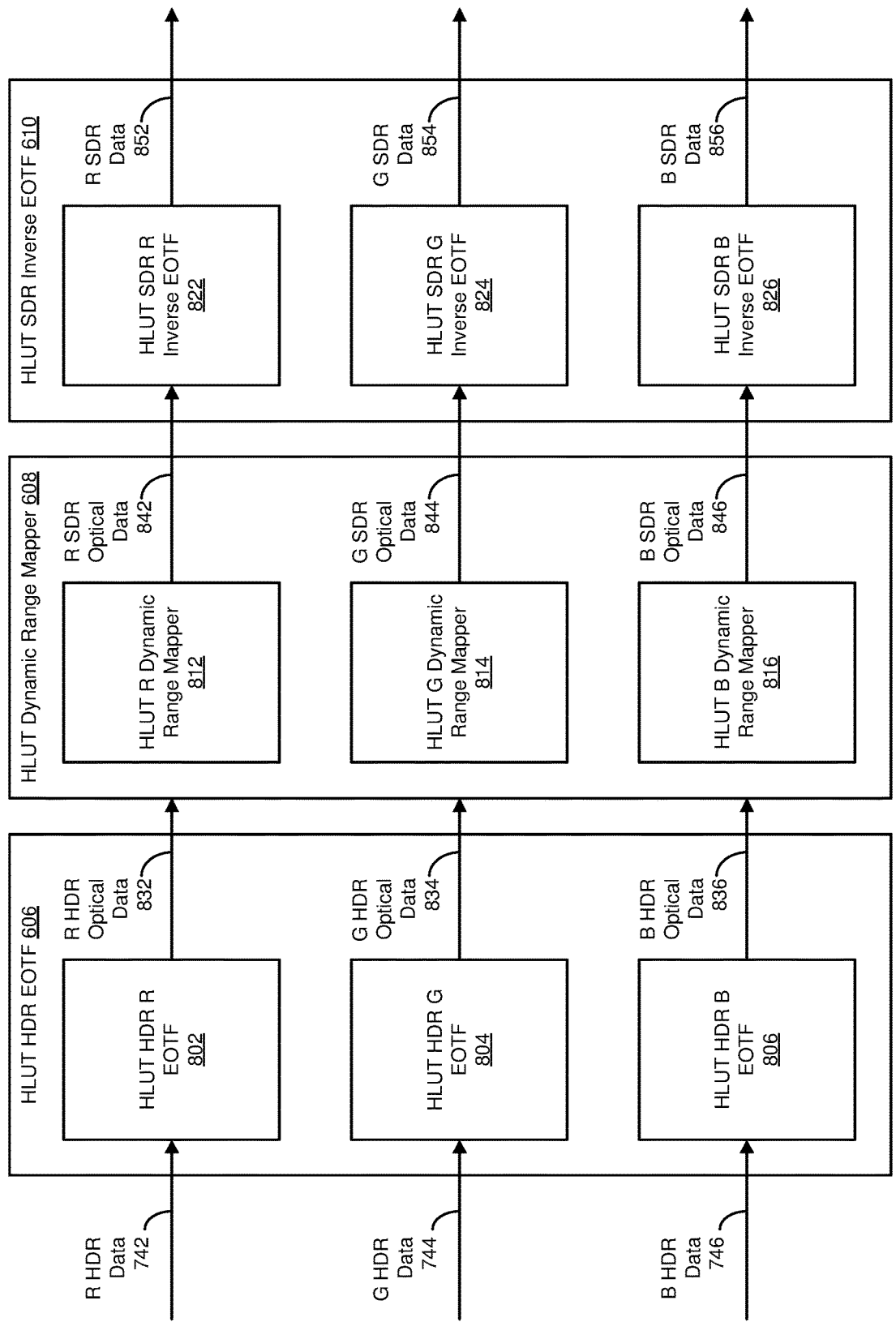
FIG. 8 is a block diagram of exemplary electro-optical transfer function (EOTF), inverse EOTF, and dynamic range mappers that may be employed in the preprocessing system of FIG. 6, where one or more of these functions may employ a hybrid lookup table function block.

FIG. 8 is a block diagram of exemplary versions of HLUT HDR EOTF 606, HLUT dynamic range mapper 608, and HLUT SDR inverse EOTF 610 that may be employed in video preprocessing system 604. As shown, HLUT HDR EOTF 606 may include a separate HLUT for each input datum from Y'CbCr-to-RGB converter 204: an HLUT HDR R EOTF 802 for R HDR data 742 to generate R HDR optical data 832, an HLUT HDR G EOTF 804 for G HDR data 744 to generate G HDR optical data 834, and an HLUT HDR B EOTF 806 for B HDR data 746 to generate B HDR optical data 836, each of which are digital data of an optical representation of the HDR video data, as may be presented via a display device. In some embodiments, both the inputs and outputs of each of EOTFs 802, 804, and 806 are floating-point values. Also, in some examples, the non-linear function for each of EOTFs 802, 804, and 806 may be obtained from Recommendation ITU-R BT.2100-2, which may employ the use of gamma-decoding to generate digital data that reflects the optical signal to be presented by a display device. In some cases, a particular EOTF defined therein, the Perceptual Quantization (PQ) EOTF, may be employed, resulting in the non-linear function for each of HLUT HDR R EOTF 802, HLUT HDR G EOTF 804, and HLUT HDR B EOTF 806 as follows, where E is the output data (e.g., R HDR optical data 832, G HDR optical data 834, or B HDR optical data 836), E' is the input data (e.g., R HDR data 742, G HDR data 744, or B HDR data 746), max is the maximum function, $m_1$=0.1593017578125, $m_2$=78.84375, $c_1$=0.8359375, $c_2$=18.8515625, and $c_3$=18.6875:

$$E = \left( \frac{\max[(E'^{1/m_2} - c_1), 0]}{c_2 - c_3 E'^{1/m_2}} \right)^{1/m_1}$$

In such embodiments, E' may be assumed to be gamma-encoded, while E may be gamma-decoded, as described above, although gamma encoding and/or decoding may be not involved in other EOTF examples. In other embodiments, another HDR EOTF, such as the Hybrid-Log-Gamma (HLG) EOTF, also specified in Recommendation ITU-R BT.2100-2, may be used for each of HLUT HDR R EOTF 802, HLUT HDR G EOTF 804, and HLUT HDR B EOTF 806.

The digital data produced by HLUT HDR EOTF 606 (e.g., R HDR optical data 832, G HDR optical data 834, and B HDR optical data 836) may be supplied to HLUT dynamic range mapper 608 for dynamic range mapping, as well as possibly color gamut conversion, from HDR video to SDR video, as represented by digital values representing R SDR optical data 842, G SDR optical data 844, and B SDR optical data 846. As shown in FIG. 8, HLUT dynamic range mapper 608 may employ separate HLUT-based mappers for each color of the SDR output (e.g., an HLUT R dynamic range mapper 812, an HLUT G dynamic range mapper 814, and an HLUT B dynamic range mapper), where each mapper 812, 814, and 816 may receive all of the input HDR optical data (e.g., R HDR optical data 832, G HDR optical data 834, and B HDR optical data 836) to generate its corresponding primary color (red, green, or blue) in SDR video format. In some examples, HLUT dynamic range mapper 608 ensures that the resulting dynamic range and/or color gamut represented in the SDR optical data is compatible with the particular display device, thus possibly ensuring that the resulting color contrast, lightness, hue, and color representation of the video data on that device are substantially correct.

In some embodiments, the mapping functions employed in each HLUT function block (e.g., HLUT R dynamic range mapper 812, HLUT G dynamic range mapper 814, and HLUT B dynamic range mapper) may be static, or unchanging, regardless of the nature of the HDR data (e.g., R HDR optical data 832, G HDR optical data 834, and B HDR optical data 836) being received. In such examples, the mapping functions may represent a worst-case scenario in which the full extent of the dynamic range and/or color gamut represented in the HDR optical data is presumed possible. However, in other embodiments, when R HDR optical data 832, G HDR optical data 834, and B HDR optical data 836 represent HDR video data, or some portion thereof, that does not occupy the full extent of the HDR-related dynamic range and/or color gamut, the mapping equations represented in HLUT dynamic range mapper 608 may be altered to limit the amount of dynamic range and/or color gamut reduction that may otherwise occur. In some examples, the mapping functions may be altered or updated once per video clip or program based on prior knowledge of the dynamic range and/or color gamut of the HDR video during that clip or program. In other examples, the mapping functions may be altered or updated once per frame or some other subset of a program or clip based on some knowledge of the dynamic range and/or color gamut of the HDR video. In yet other embodiments, the mapping functions may be updated periodically over time and may be different for each of a plurality of regions or areas of each frame of the HDR video. In each of these embodiments, the mapping functions may be based at least in part on a maximum dynamic range and/or color gamut for HDR video (e.g., as specified in Recommendation ITU-R BT.2020-2) and a maximum dynamic range and/or color gamut for SDR video (e.g., as specified in Recommendation ITU-R BT 709-6).

Further regarding FIG. 8, the values for R SDR optical data 842, G SDR optical data 844, and B SDR optical data 846 generated by HLUT dynamic range mapper 608 may be presented to HLUT SDR inverse EOTF 610, which may employ that data to generate SDR video data in RGB format based on an inverse EOTF specified for that format. More specifically, HLUT SDR inverse EOTF 610 may include, for each primary color, a separate inverse EOTF (e.g., HLUT SDR R inverse EOTF 822 that generates R SDR data 852 from R SDR optical data 842, HLUT SDR G inverse EOTF 824 that generates G SDR data 854 from G SDR optical data 844, and HLUT SDR B inverse EOTF 826 that generates B SDR data 856 from B SDR optical data 846). In some embodiments, the functions employed in HLUT SDR R inverse EOTF 822, HLUT SDR G inverse EOTF 824, and HLUT SDR B inverse EOTF 826 for SDR data may include gamma encoding and may be a standardized EOTF (e.g., as specified in Recommendation ITU-R BT.1886). For example, for each input (e.g., R SDR optical data 842, G SDR optical data 844, and B SDR optical data 846), the corresponding HLUT inverse EOTF may generate a digital value for a corresponding gamma-encoded electrical signal output (e.g., R SDR data 852, G SDR data 854, and B SDR data 856) according to the following non-linear function, wherein E is the optical data input and E' is the gamma-encoded electrical data output:

$$E' = (E)1/2.4$$

Further, in at least some embodiments, each input and/or output value depicted in FIG. 8 may take the form of a floating-point value from zero to one.

Figure 9:
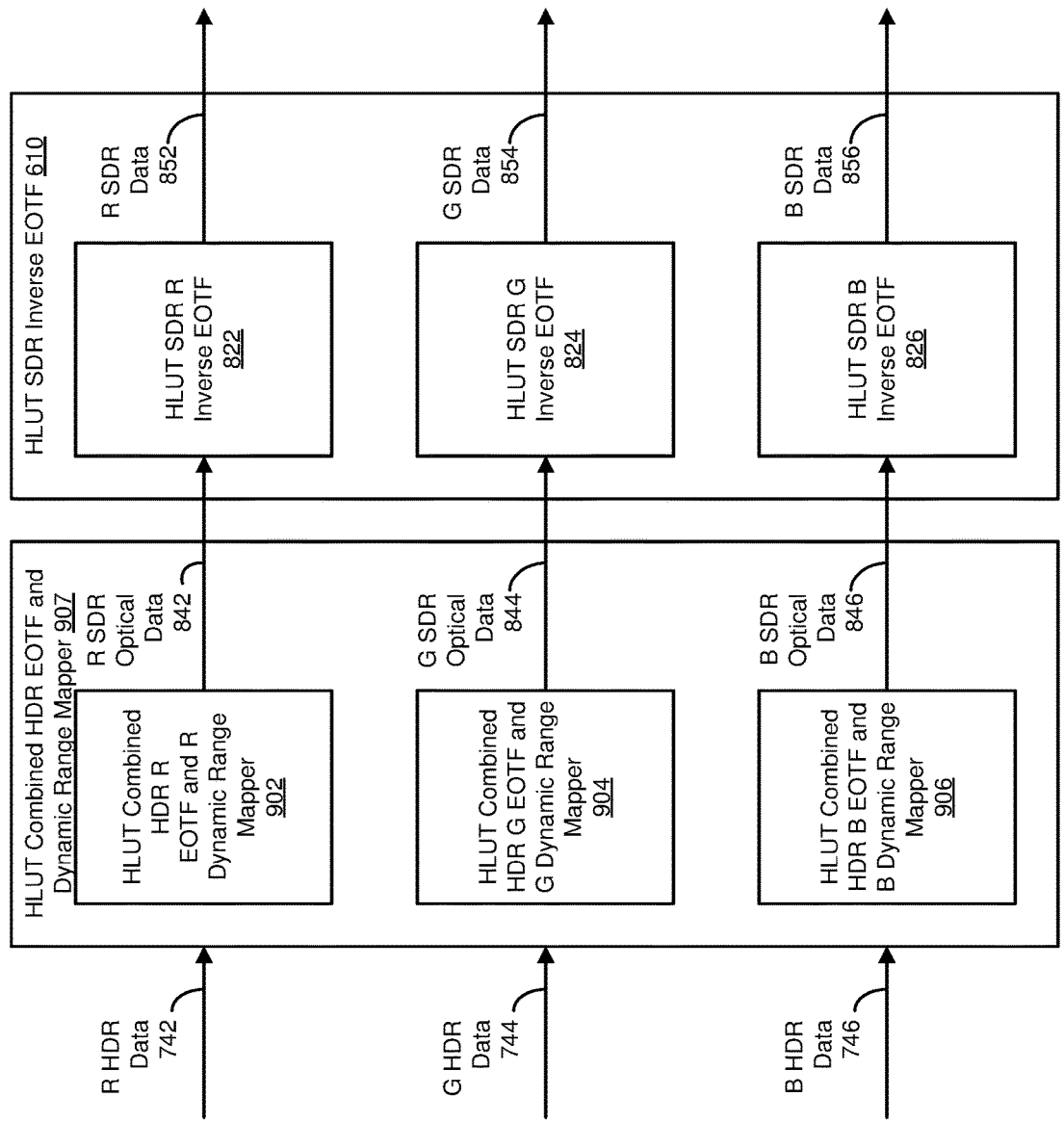
FIG. 9 is a block diagram of operations corresponding to those of FIG. 8, with the EOTF and dynamic range mapper combined.

FIG. 9 is a block diagram of function blocks corresponding to those of FIG. 8, with the functionality of HLUT HDR EOTF 606 and HLUT dynamic range mapper 608 combined into a HLUT combined HDR EOTF and dynamic range mapper 907. In some examples, HLUT combined HDR EOTF and dynamic range mapper 907 may include a separate HLUT function block for each primary color (e.g., red, green, and blue), such as HLUT combined HDR R EOTF and R dynamic range mapper 902, HLUT combined HDR G EOTF and G dynamic range mapper 904, and HLUT combined HDR B EOTF and B dynamic range mapper 906, each of which may receive all of R HDR data 742, G HDR data 744, and B HDR data 746, and then generate its corresponding digital data signifying optical light in primary color format (e.g., R SDR optical data 842, G SDR optical data 844, and B SDR optical data 846). Also, in some embodiments, each of the HLUT combined function blocks 902, 904, and 906 may employ a combination of the non-linear functions described above for HLUT HDR EOTF 606 and HLUT dynamic range mapper 608 of FIG. 8.

Figure 10:
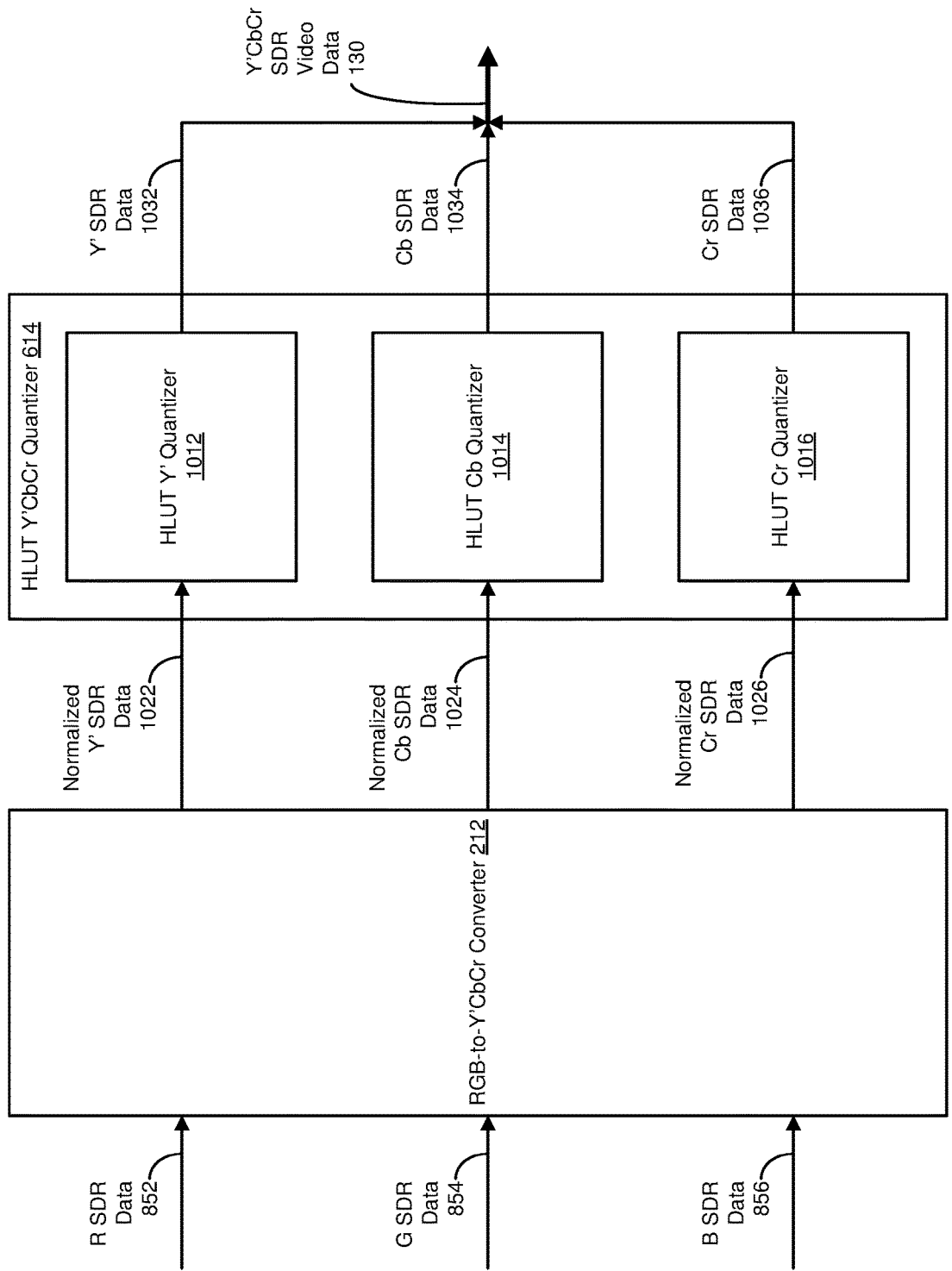
FIG. 10 is a block diagram of an exemplary video data quantizer, along with a video format converter, that may be employed in the video preprocessing system of FIG. 6.

FIG. 10 is a block diagram of an exemplary video data quantizer (e.g., HLUT Y'CbCr quantizer 614), along with a video format converter (e.g., RGB-to-Y'CbCr converter 212), that may be employed in video preprocessing system 600 of FIG. 6. RGB-to-Y'CbCr converter 212, in some examples, may receive R SDR data 852, G SDR data 854, and B SDR data 856 (designated as R, G, and B below) from HLUT SDR inverse EOTF 610 and convert each set of primary color value (e.g., red, green, and blue) to corresponding normalized luma/chroma values (e.g., normalized Y' SDR data 1022, normalized Cb SDR data 1024, and normalized Cr SDR data 1026). In some examples, both the inputs and outputs of RGB-to-Y'CbCr converter 212 are floating-point values. Further, in some embodiments, each normalized luma/chroma value may be a linear combination of all primary color inputs. In some examples, normalized Y' SDR data 1022 (e.g., r normalized in the range of zero to one), normalized Cb SDR data 1024 ($Cb_{normalized}$ in the range of −0.5 to 0.5), and normalized Cr SDR data 1026 ($Cr_{normalized}$ in the range of −0.5 to 0.5) may be generated according to the following linear functions, although other functions are also possible:

$$\begin{bmatrix} Y'_{normalized} \\ Cb_{normalized} \\ Cr_{normalized} \end{bmatrix} = \begin{bmatrix} 0.2126 & 0.7152 & 0.0722 \\ -0.11457 & -0.38543 & 0.5 \\ 0.5 & -0.45415 & 0.04585 \end{bmatrix} \begin{bmatrix} R \\ G \\ B \end{bmatrix}$$

Thereafter, HLUT Y'CbCr quantizer 614 may receive and convert the output from RGB-to-Y'CbCr converter 212 (e.g., as normalized floating-point values) into quantized N-bit fixed-point positive-integer values (e.g., where N=8, 10, 12, 14, 16, etc.). More particularly, as depicted in FIG. 10, HLUT Y'CbCr quantizer 614 may include a separate HLUT function block (e.g., HLUT Y' quantizer 1012, HLUT Cb quantizer 1014, and HLUT Cr quantizer 1016, respectively) for each normalized input component (e.g., normalized Y' SDR data 1022, normalized Cb SDR data 1024, and normalized Cr SDR data 1026) that generates a corresponding quantized data value (e.g., Y' SDR data 1032, Cb SDR data 1034, and Cr SDR data 1036), which together may constitute Y'CbCr SDR video data 130. In some embodiments, each HLUT quantizer (e.g., HLUT Y' quantizer 1012, HLUT Cb quantizer 1014, and HLUT Cr quantizer 1016) within HLUT Y'CbCr quantizer 614 may perform a piecewise-linear approximation of a non-linear function for its corresponding luma/chroma component, as shown below, where N is the number of bits of fixed-point Y' SDR data 1032, Cb SDR data 1034, and Cr SDR data 1036, respectively (e.g., N=8, 10, 12, or the like), and "Round" is a rounding operation:

$$Y' = \text{Round}((1 << (N-8)) * (219 * Y'_{normalized} + 16))$$

$$Cb = \text{Round}((1 << (N-8)) * (224 * Cb_{normalized} + 128))$$

$$Cr = \text{Round}((1 << (N-8)) * (224 * Cr_{normalized} + 128))$$

In some embodiments, Y'CbCr SDR video data 130, the dynamic range and/or color gamut of which may be properly adjusted from original Y'CbCr HDR video data 120, may then be compressed (e.g., by SDR video compression system 106) to yield compressed Y'CbCr SDR video data 140 for ultimate transmission to, and display on, SDR video display device 108.

In view of the various embodiments describe above in conjunction with FIGS. 1-10, legacy SDR video data display devices that are substantially incompatible with newer HDR video data may display video programs and clips originating from HDR video data that has been preprocessed, including a controlled (and possibly custom) mapping of dynamic range and/or color gamut for SDR compatibility, to generate SDR video data that may eliminate displeasing visual artifact in the absence of such mapping. Moreover, in some examples, one or more function blocks implementing non-linear functions in such a preprocessor may employ a hybrid LUT circuit arrangement that may reduce overall footprint and/or power consumption over other LUT-based architectures. Further, such HLUT architectures, as described above, may be employed in other circuit and software applications outside of the video processing context.

Example Embodiments

Example 1: A method for preprocessing video data may include (1) receiving an input datum to be processed using a non-linear function to produce an output datum, (2) comparing the input datum to a plurality of indexes of a lookup table, where the indexes designate input endpoints of a plurality of piecewise-linear sections approximating the non-linear function, and where the lookup table further includes, for each of the indexes (a) a slope of the piecewise-linear section corresponding to the index, and (b) an axis intercept of the piecewise-linear section corresponding to the index, (3) selecting, based on comparing the input datum to the plurality of indexes, an index of the indexes that designates the piecewise-linear section associated with the input datum, and (4) calculating, using the slope and the axis intercept corresponding to the selected index, the output datum corresponding to the input datum.

Example 2: The method of Example 1, where calculating the output datum may further include (1) multiplying the input datum by the slope corresponding to the selected index to yield a product, and (2) adding the axis intercept corresponding to the selected index to the product to generate the output datum.

Example 3: The method of either Example 1 or Example 2, where each of the indexes may designate a lower endpoint of the input endpoints of the piecewise-linear section corresponding to the index.

Example 4: The method of either Example 1 or Example 2, where a spacing between numerical values of the plurality of indexes may be constant.

Example 5: The method of either Example 1 or Example 2, where a spacing between numerical values of the plurality of indexes may be variable based at least in part on a curve described by the non-linear function.

Example 6: The method of either Example 1 or Example 2, where the axis intercept may be associated with the output datum.

Example 7: The method of either Example 1 or Example 2, where (1) the input datum may include a video datum in a luma/chroma format, and (2) the non-linear function may include a normalization of the video datum in the luma/chroma format.

Example 8: The method of either Example 1 or Example 2, where (1) the input datum may include a video datum in a primary color format, and (2) the non-linear function may include an electro-optical transfer function (EOTF) that produces a digital datum that designates an optical representation of the video datum in the primary color format.

Example 9: The method of either Example 1 or Example 2, where (1) the input datum may include a digital datum that designates an optical representation of a high-dynamic-range (HDR) video datum in a primary color format, and (2) the non-linear function may include a dynamic range mapping function that maps the digital datum of the optical representation of the HDR video datum to a digital datum of an optical representation of a standard-dynamic-range (SDR) video datum in the primary color format.

Example 10: The method of Example 9, where the dynamic range mapping function further includes a mapping from an HDR color gamut of the HDR video datum to an SDR color gamut of the SDR video datum.

Example 11: The method of either Example 1 or Example 2, where (1) the input datum may include a high-dynamic-range (HDR) video datum in a primary color format, and (2) the non-linear function may include a combination of (a) an electro-optical transfer function (EOTF) that produces a digital datum that designates an optical representation of the HDR video datum in the primary color format, and (b) a dynamic range mapping function that maps the digital datum that designates the optical representation of the HDR video datum to a digital datum of an optical representation of a standard-dynamic-range (SDR) video datum in the primary color format.

Example 12: The method of either Example 1 or Example 2, where (1) the input datum may include a digital datum of an optical representation of a standard-dynamic-range (SDR) video datum in a primary color format, and (2) the non-linear function may include an inverse electro-optical transfer function (EOTF) that produces the SDR video datum in the primary color format from the digital datum of the optical representation of the SDR video datum in the primary color format.

Example 13: The method of either Example 1 or Example 2, wherein (1) the input datum may include a normalized standard-dynamic-range (SDR) video datum in a luma/chroma format, and (2) the non-linear function may include a quantizing function that quantizes the normalized SDR video datum in the luma/chroma format to a quantized SDR video datum in the luma/chroma format.

Example 14: A piecewise-linear function circuit may include (1) a lookup table including a plurality of indexes, wherein the indexes designate endpoints of piecewise-linear sections approximating a non-linear function, and wherein the lookup table further includes, for each of the indexes, (a) a slope of the piecewise-linear section corresponding to the index, and (b) an axis intercept of the piecewise-linear section corresponding to the index, (2) a digital comparator circuit that selects, in response to an input datum, an index of the indexes that designates the piecewise-linear section associated with the input datum, and (3) a calculation circuit that calculates, using the slope and the axis intercept corresponding to the selected index, an output datum corresponding to the input datum.

Example 15: The piecewise-linear function circuit of Example 14, where (1) the input datum may include a fixed-point value, and (2) the output datum may include a floating-point value.

Example 16: The piecewise-linear function circuit of Example 14, where the input datum and the output datum may each include a floating-point value.

Example 17: The piecewise-linear function circuit of Example 14, where (1) the input datum may include a floating-point value, and (2) the output datum may include a fixed-point value.

Example 18: A video preprocessing system may include a plurality of circuits that perform a plurality of operations to convert high-dynamic-range (HDR) video data to standard-dynamic-range (SDR) video data, where at least one of the plurality of circuits includes a piecewise-linear function circuit including (1) a lookup table including a plurality of indexes, where the indexes designate endpoints of piecewise-linear sections approximating a non-linear function for one of the operations, and where the lookup table further includes, for each of the indexes, (a) a slope of the piecewise-linear section corresponding to the index, and (b) an axis intercept of the piecewise-linear section corresponding to the index, (2) a digital comparator circuit that selects, in response to an input datum, an index of the indexes that designates the piecewise-linear section associated with the input datum, and (3) a calculation circuit that calculates, using the slope and the axis intercept corresponding to the selected index, an output datum corresponding to the input datum.

Example 19: The video preprocessing system of Example 18, where the non-linear function may include a dynamic range mapping function that maps the HDR video data to the SDR video data.

Example 20: The video preprocessing system of Example 19, where the dynamic range mapping function is modified over time based on the HDR video data.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Any modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks. In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
  receiving an input datum to be processed using a non-linear function to produce an output datum;
  comparing the input datum to a plurality of indexes of a lookup table, wherein the plurality of indexes designate input endpoints of a plurality of piecewise-linear sections approximating the non-linear function, and wherein the lookup table further comprises, for each of the plurality of indexes:
    a slope of the piecewise-linear section corresponding to the index; and
    an axis intercept of the piecewise-linear section corresponding to the index;
  selecting, based on comparing the input datum to the plurality of indexes, an index of the plurality of indexes that designates the piecewise-linear section associated with the input datum; and
  calculating, using the slope and the axis intercept corresponding to the selected index, the output datum corresponding to the input datum;
  wherein the input datum comprises a high-dynamic-range (HDR) video datum in a primary color format; and
  wherein the non-linear function comprises:
    combinations of electro-optical transfer functions (EOTFs) and corresponding dynamic range mapping functions for each of a plurality of primary colors, wherein each of the EOTFs produces digital data that designates an optical representation of the HDR video datum in a primary color format and
    each corresponding dynamic range mapping function maps the digital data that designates the optical representation of the HDR video datum in the primary color format to a digital datum of an optical representation of a standard-dynamic-range (SDR) video datum in the primary color format; and
    inverse EOTFs corresponding to the combinations of EOTFs and dynamic range mapping functions for each of the plurality of primary colors, wherein each of the inverse EOTFs produces SDR video datum in the primary color format, and the inverse EOTFs are independent of the EOTFs.

2. The method of claim 1, wherein calculating the output datum comprises:
  multiplying the input datum by the slope corresponding to the selected index to yield a product; and adding the axis intercept corresponding to the selected index to the product to generate the output datum.

3. The method of claim 1, wherein each of the plurality of indexes designates a lower endpoint of the input endpoints of the piecewise-linear section corresponding to the index.

4. The method of claim 1, wherein a spacing between numerical values of the plurality of indexes is constant.

5. The method of claim 1, wherein a spacing between numerical values of the plurality of indexes is variable based at least in part on a curve described by the non-linear function.

6. The method of claim 1, wherein the axis intercept is associated with the output datum.

7. The method of claim 1, further comprising, separately for each of the plurality of primary colors:
  normalizing an HDR video datum in a luma/chroma format to produce a normalized HDR video datum in the luma/chroma format; and
  converting the normalized HDR video datum in the luma/chroma format to produce the HDR video datum in the primary color format.

8. The method of claim 7, further comprising, separately for each of the plurality of primary colors:
  converting the SDR video datum in the primary color format to SDR video datum in the luma/chroma format; and
  normalizing the SDR video datum in the luma/chroma format to produce a normalized SDR video datum in the luma/chroma format.

9. The method of claim 8, further comprising
  quantizing the normalized SDR video datum in the luma/chroma format to a quantized SDR video datum in the luma/chroma format.

10. The method of claim 1, wherein each of the dynamic range mapping functions further include a mapping from an HDR color gamut of the HDR video datum to an SDR color gamut of the SDR video datum.

11. A piecewise-linear function circuit comprising:
  a lookup table comprising a plurality of indexes, wherein the plurality of indexes designate endpoints of piecewise-linear sections approximating a non-linear function, and wherein the lookup table further comprises, for each of the plurality of indexes:
    a slope of the piecewise-linear section corresponding to the index; and
    an axis intercept of the piecewise-linear section corresponding to the index;
  a digital comparator circuit that selects, in response to an input datum, an index of the plurality of indexes that designates the piecewise-linear section associated with the input datum; and
  a calculation circuit that calculates, using the slope and the axis intercept corresponding to the selected index, an output datum corresponding to the input datum;
  wherein the input datum comprises a high-dynamic-range (HDR) video datum in a primary color format; and
  wherein the non-linear function comprises:
    combinations of electro-optical transfer functions (EOTFs) and corresponding dynamic range mapping functions for each of a plurality of primary colors, wherein each of the EOTFs produces digital data that designates an optical representation of the HDR video datum in a primary color format and
    each corresponding dynamic range mapping function maps the digital data that designates the optical representation of the HDR video datum in the primary color format to a digital datum of an optical representation of a standard-dynamic-range (SDR) video datum in the primary color format; and
    inverse EOTFs corresponding to the combinations of EOTFs and dynamic range mapping functions for each of the plurality of primary colors, wherein each of the inverse EOTFs produces SDR video datum in the primary color format, and the inverse EOTFs are independent of the EOTFs.

12. The piecewise-linear function circuit of claim 11, wherein:
  the input datum comprises a fixed-point value; and
  the output datum comprises a floating-point value.

13. The piecewise-linear function circuit of claim 11, wherein:
  the input datum and the output datum each comprises a floating-point value.

14. The piecewise-linear function circuit of claim 11, wherein:
  the input datum comprises a floating-point value; and
  the output datum comprises a fixed-point value.

15. A video preprocessing system comprising:
  a plurality of circuits that perform a plurality of operations to convert high-dynamic-range (HDR) video data to standard-dynamic-range (SDR) video data, wherein at least one of the plurality of circuits comprises a piecewise-linear function circuit comprising:
    a lookup table comprising a plurality of indexes, wherein the plurality of indexes designate endpoints of piecewise-linear sections approximating a non-linear function for one of the operations, and wherein the lookup table further comprises, for each of the plurality of indexes:
      a slope of the piecewise-linear section corresponding to the index; and
      an axis intercept of the piecewise-linear section corresponding to the index;
    a digital comparator circuit that selects, in response to an input datum, an index of the plurality of indexes that designates the piecewise-linear section associated with the input datum; and
    a calculation circuit that calculates, using the slope and the axis intercept corresponding to the selected index, an output datum corresponding to the input datum;
  wherein the input datum comprises an HDR video datum in a primary color format; and
  wherein the non-linear function comprises:
    combinations of electro-optical transfer functions (EOTFs) and corresponding dynamic range mapping functions for each of a plurality of primary colors, wherein each of the EOTFs produces digital data that designates an optical representation of the HDR video datum in a primary color format; and
    each corresponding dynamic range mapping function that maps the digital data that designates the optical representation of the HDR video datum in the primary color format to a digital datum of an optical representation of a standard-dynamic-range (SDR) video datum in the primary color format; and
    inverse EOTFs corresponding to the combinations of EOTFs and dynamic range mapping functions for each of the plurality of primary colors, wherein each of the inverse EOTFs produces SDR video datum in the primary color format, and the inverse EOTFs are independent of the EOTFs.

16. The video preprocessing system of claim 15, wherein each of the dynamic range mapping functions further include a mapping from an HDR color gamut of the HDR video data to an SDR color gamut of the SDR video data.

17. The video preprocessing system of claim 15, wherein the dynamic range mapping functions are modified over time based on the HDR video data.

18. The video preprocessing system of claim 15, wherein the calculation circuit calculates the output datum corresponding to the input datum by:
   multiplying the input datum by the slope corresponding to the selected index to yield a product; and
   adding the axis intercept corresponding to the selected index to the product to generate the output datum.

19. The video preprocessing system of claim 15, wherein each of the plurality of indexes designates a lower endpoint of the input endpoints of the piecewise-linear section corresponding to the index.

20. The video preprocessing system of claim 15, wherein the axis intercept is associated with the output datum.

* * * * *